(12) United States Patent
Sasaki et al.

(10) Patent No.: US 7,609,033 B2
(45) Date of Patent: Oct. 27, 2009

(54) BATTERY TEMPERATURE CONTROLLER FOR ELECTRIC VEHICLE

(75) Inventors: Takahiro Sasaki, Saitama (JP); Teruo Wakashiro, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 285 days.

(21) Appl. No.: 11/641,077

(22) Filed: Dec. 19, 2006

(65) Prior Publication Data
US 2007/0152640 A1    Jul. 5, 2007

(30) Foreign Application Priority Data
Jan. 4, 2006  (JP)  ............................ 2006-000065

(51) Int. Cl.
*H01M 10/46* (2006.01)
(52) U.S. Cl. ...................................................... 320/150
(58) Field of Classification Search ................. 320/104, 320/107, 112, 150; 180/60, 53.1; 62/259.1, 62/259.2
See application file for complete search history.

(56) References Cited

U.S. PATENT DOCUMENTS

| 5,490,572 A | 2/1996 | Tajiri et al. |
| 5,937,664 A * | 8/1999 | Matsuno et al. ............ 62/259.2 |
| 2002/0023790 A1 | 2/2002 | Hata et al. |
| 2007/0089442 A1 * | 4/2007 | Tsuchiya ..................... 62/186 |

FOREIGN PATENT DOCUMENTS

| JP | 05-262144 A | 10/1996 |
| JP | 2000-209789 A | 7/2000 |
| JP | 2001-130268 A | 5/2001 |

* cited by examiner

*Primary Examiner*—Edward Tso
(74) *Attorney, Agent, or Firm*—Arent Fox LLP

(57) ABSTRACT

A controller in the electric vehicle is provided in which data which are criteria to determine a magnitude of degradation tendency of a high-voltage secondary cell are stored in a ROM in a high-voltage battery electrical controller. When it is detected that an ignition switch is turned off, the magnitude of the degradation tendency is determined depending on a temperature of the high-voltage secondary cell and a state of charge value based on the data. When it is determined that the degradation tendency is large, the battery fan and the air conditioner are operated so that the state of charge value and the temperature decrease. Next, while repeating determination of the magnitude of the degradation tendency, when it is determined that the degradation tendency is small, the operation of the battery fan and the air conditioner is stopped. Therefore, the state of charge value is prevented from decreasing more than necessary.

9 Claims, 11 Drawing Sheets

IG SWITCH

STATE OF CHARGE (SOC)
OF HIGH-VOLTAGE BATTERY

TEMPERATURE (T) OF
HIGH-VOLTAGE BATTERY

OPERATION OF AIR
CONDITIONER 18 AND
BATTERY FAN 24

SOCt0 > SOCth0 OR Tt0 > Tth0

TEMPERATURE T OF HIGH-VOLTAGE BATTERY (°C)

TEMPERATURE T OF HIGH-VOLTAGE BATTERY (°C)

BATTERY TEMPERATURE CONTROLLER FOR ELECTRIC VEHICLE

CROSS REFERENCE TO RELATED APPLICATIONS

This application claims the foreign priority benefit under Title 35, United States Code, §119(a)-(d) of Japanese Patent Application No. 2006-000065, filed on Jan. 4, 2006 in the Japan Patent Office, the disclosure of which is herein incorporated by reference in its entirety.

BACKGROUND OF THE INVENTION

1. Field of the Invention

The present invention relates to a controller installed in an electric vehicle including a storage battery in which the higher values of temperature and state of charge are, the larger performance degradation tendency is.

2. Description of the Related Art

A lithium-ion battery is used in an electric vehicle such as an electric car, a fuel cell car, and a hybrid car to supply power to a drive motor and to store power regenerated by the drive motor and power generated by a fuel cell. The lithium-ion battery with a higher temperature and SOC (State Of Charge) value can be more easily degraded. As for a car (electric vehicle) using a storage battery (high-voltage secondary cell) including the lithium-ion battery with such a property, there have been examined various devices and proposals for controlling to keep the storage battery in a good state.

For instance, there is disclosed a battery temperature controller which keeps a temperature of a storage battery within a predetermined range during electrical charge and discharge of the storage battery, so as to control to maintain desired efficiency of the electrical charge and discharge (see JP H05-262144A).

Moreover, there is disclosed a forced-air cooling apparatus of a storage battery for an electric vehicle, which can prevent high temperature degradation of the storage battery with a little power consumption in consideration of outside temperature (see JP 2001-130268A).

SUMMARY OF THE INVENTION

However, in both technologies described in JP H05-262144A and JP 2001-130268, a battery is controlled while a vehicle is running or while the vehicle is stopping and the battery is being charged from an external charger. Therefore, it is impossible to prevent battery performance degradation in a state (referred to as a soak state, hereafter) where the electric vehicle is stopping and a high-voltage secondary cell (storage battery) is not being charged or discharged.

It is an object of the present invention to provide a controller of an electric vehicle which can prevent performance degradation of a storage battery.

To solve the problem, in one aspect of the present invention, there is provided a controller installed in an electric vehicle including a storage battery which stores power to be supplied to a drive motor, a temperature sensor which detects a temperature of the storage battery, a state of charge value sensor which detects a state of charge value of the storage battery, a fan which cools the storage battery, and an air conditioner which has an electric compressor driven by the power supplied from the storage battery. The controller installed in the electric vehicle controls operation of at least one of the fan and the electric compressor, including a cooling control means which cools the storage battery by means of selectively or simultaneously driving at least one of the fan and the air conditioner after detecting a stop request of the electric vehicle, depending on the temperature detected by the temperature sensor and the state of charge value detected by the state of charge value sensor.

The controller with such a structure selectively or simultaneously drives at least one of the fan and the air conditioner depending on the temperature detected by the temperature sensor and the state of charge value detected by the state of charge value sensor after detecting the stop request of the electric vehicle. Accordingly, the temperature and the state of charge value of the storage battery decrease. As a result, it is possible to prevent performance degradation of the storage battery.

In the controller installed in the electric vehicle according to the present invention, if the state of charge value detected by the state of charge value sensor exceeds a predetermined state of charge value set corresponding to the temperature detected by the temperature sensor, the cooling control means may selectively or simultaneously drive at least one of the fan and the air conditioner. In the controller with such a structure, neither the fan nor the air conditioner is driven when not necessary such as when the state of charge value does not exceed the predetermined state of charge value.

In the controller installed in the electric vehicle according to the present invention, if the temperature detected by the temperature sensor exceeds a predetermined temperature and the state of charge value detected by the state of charge value sensor exceeds a predetermined state of charge value, the cooling control means may selectively or simultaneously drive at least one of the fan and the air conditioner. The controller with such a structure can reduce volume of data since the predetermined temperature and the predetermined state of charge value are used instead of the state of charge value set corresponding to the temperature detected by the temperature sensor.

In the controller installed in the electric vehicle according to the present invention, if the state of charge value detected by the state of charge value sensor exceeds a predetermined state of charge value set corresponding to the temperature detected by the temperature sensor, the cooling control means may drive the fan. In addition, if the state of charge value detected by the state of charge value sensor exceeds the predetermined state of charge value set corresponding to the temperature detected by the temperature sensor and at least one of the temperature detected by the temperature sensor and the state of charge value detected by the state of charge value sensor exceeds a respective predetermined value, the cooling control means may drive the fan and the air conditioner together. When the temperature is not so high and only a little decrease of the state of charge value is required, the controller with such a structure can prevent the state of charge value from decreasing more than necessary.

In the controller installed in the electric vehicle according to the present invention, if the state of charge value detected by the state of charge value sensor exceeds a first predetermined state of charge value set corresponding to the temperature detected by the temperature sensor, the cooling control means may drive the fan. In addition, if the state of charge value further exceeds a second predetermined state of charge value exceeding the first predetermined state of charge value, the cooling control means may drive the fan and the air conditioner together. The controller with such a structure can more preferably control operation of the air conditioner since not only the first predetermined state of charge value, but also the second predetermined state of charge value is used to determine whether to start the air conditioner.

In the controller installed in the electric vehicle according to the present invention, the relatively higher the temperature is, the lower value the predetermined state of charge value set corresponding to the temperature detected by the temperature sensor may be, and the relatively lower the temperature is, the higher the predetermined state of charge value set corresponding to the temperature detected by the temperature sensor may be.

In the controller installed in the electric vehicle according to the present invention, the storage battery may include a lithium-ion battery.

BRIEF DESCRIPTION OF THE DRAWINGS

The object and features of the present invention will become more readily apparent from the following detailed description taken in conjunction with the accompanying drawings in which.

DESCRIPTION OF THE PREFERRED EMBODIMENTS

First Embodiment

Next, here will be described a controller (control unit) in an electric vehicle according to an embodiment of the present invention in detail, referring to the accompanying drawings. The same elements or parts are designated with the same references throughout the drawings.

First of all, referring to FIGS. 1 and 2, here will be described a structure of an electric vehicle (referred to as "a vehicle", hereafter) including a high-voltage battery control system and a battery ECU (Electrical Control Unit).

Figure 1:
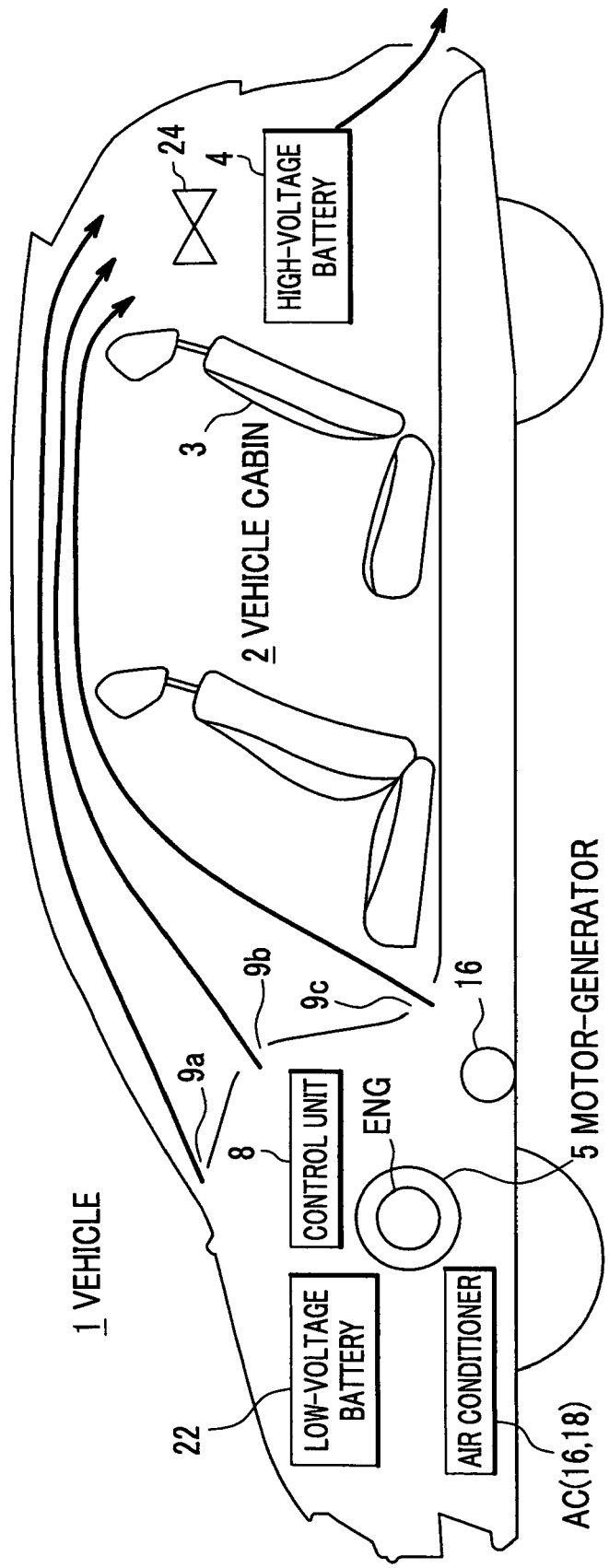
FIG. 1 is a schematic sectional view of a vehicle according to an embodiment of the invention.

FIG. 1 is a schematic sectional view of a vehicle which uses a high-voltage battery (storage battery) including a lithium-ion battery and can prevent performance degradation of the storage battery during a soak (in a soak state where the vehicle is stopping and the storage battery is not being charged or discharged) according to the embodiment. FIG. 2 is a schematic principal block diagram conceptually showing a structure of the vehicle 1 focusing on a high-voltage battery control system. A representative example of the vehicle 1 is a hybrid vehicle. However, either an electric vehicle or a fuel cell vehicle also can be employed as the vehicle 1 as long as the vehicle uses the high-voltage battery including a battery such as a lithium-ion battery, which has a property of being degraded as time elapses when being left under conditions of high temperature and high SOC. Moreover, a vehicle with any kind of shape and form such as a track construction vehicle can be employed as the vehicle 1. "A storage battery which stores power to be supplied to a drive motor" in the claims corresponds to the high-voltage battery 4.

As shown in FIG. 1, the vehicle 1 includes a high-voltage battery 4 which is placed on a rear side of a back seat 3 in a vehicle cabin 2 to be used as a power source, and a battery fan (fan) 24 which is fixed above the high-voltage battery 4 in order to cool the high-voltage battery 4. Moreover, the vehicle 1 includes under a front bonnet a motor-generator (MG) 5 which is a motor capable of generating power, an engine ENG which is directly connected to the motor-generator (MG) 5, an air conditioner AC, an electric compressor 16 of the air conditioner AC, which is placed under the air conditioner AC, a low-voltage battery 22 which is placed above the air conditioner AC in order to store power of low-voltage (12V, typically), and a control unit 8 which contains an electronic circuit for control.

Air-conditioned air released from the air conditioner AC is blown into the vehicle cabin 2 through air outlets 9a, 9b, and 9c in a front portion in the vehicle cabin 2. Therefore, the high-voltage battery 4 is efficiently cooled by cool air from the air conditioner AC as a battery fan 24 rotates while the air conditioner AC is operating.

Next, a connection structure in the vehicle 1 will be described using FIG. 2. The vehicle 1 includes a high-voltage battery 4, a PDU (Power Drive Unit) 6, a high-voltage battery control system 10, a motor-generator ECU (MG ECU) 7, an engine ENG, an ignition switch 40 (IG switch), and an engine ECU (ENG ECU) 82 which controls the engine ENG using signals from the ignition switch (IG switch) 40. Here, the PDU 6, which is connected to the motor-generator 5, supplies and regenerates power. In addition, the motor-generator ECU (MG ECU) 7 controls the PDU 6.

The high-voltage battery control system 10 controls a state (a temperature and a state of charge (referred to as "an SOC (State Of Charge)", hereafter)) of the high-voltage battery 4. The high-voltage battery control system 10 includes the battery fan 24 which cools the high-voltage battery 4, the compressor 16 of the air conditioner AC, and an air conditioner fan 18. Here, the high-voltage battery 9 drives the compressor 16 of the air conditioner AC through a contactor 15 and the PDU 17. As for the air conditioner fan 18, power is supplied from the low-voltage battery 22. The low-voltage battery 22 is charged with low voltage power converted from power of the high-voltage battery 4 through a DC/DC converter (DC/DC) 20.

An air conditioner ECU 19 controls the PDU 17 and the air conditioner fan 18. Moreover, a battery ECU 30 controls the air conditioner ECU 19, the DC/DC converter 20, the battery fan 24, and the contactor 15. A cooling control means in the claims includes the air conditioner ECU 19 and the battery ECU 30. In addition, signals from a plurality of temperature sensors 12 which are contained or built in the high-voltage battery 4, signals from an SOC information acquisition unit (state of charge value sensor) 14 which monitors output voltage and current of the high-voltage battery 4 to acquire SOC information which is information of the SOC, and signals from the engine ECU 82 are input to the battery ECU 30.

Here, the battery ECU 30 is a computer including a ROM (Read Only Memory) 33 which stores programs 35 and battery control data 36, a CPU 31, and a RAM (Random Access Memory) 32. Thus, functions of each module are performed by these hardware and programs. The control unit (controller) 8 includes the battery ECU 30, the air conditioner ECU 19, the motor-generator ECU (MG ECU) 7, and the engine ECU 82.

The battery fan 24 is connected to the low-voltage battery 22 so as to cool the high-voltage battery 4. In addition, the motor-generator ECU (MG ECU) 7, the air conditioner ECU 19 which is a cooling control means, the battery ECU 30, and the engine ECU 82 are connected each other through a bus 84, each of which can send and receive data acquired from sensors or generated in control processes. In the example, it is assumed that the ECUs 7, 19, 30, and 82 are contained in a single control unit 8 for convenience of explanation. However, the ECUs may be used separately or in any combination of two or more thereof.

The SOC information acquisition unit 14 includes a voltage sensor V and a current sensor A. The battery ECU 30 keeps the contactor 15 open so that a value of SOC (referred to as "SOC value", hereafter) is calculated from a ratio between a no-load voltage when the high-voltage battery 4 is in use and a no-load voltage when the high-voltage battery 4 is maximum charged. Various kinds of methods for calculating the SOC value are known and may be implemented in a circuit dedicated to calculate the SOC value.

In the embodiment, in general, the high-voltage battery 4 is implemented as a combination battery or a battery pack in which a necessary number of modules including a plurality of lithium-ion batteries are combined. FIG. 3 is a graph showing a property of battery performance degradation in cases where the SOC values of the high-voltage battery 4 shown in FIGS. 1 and 2 are almost equal to a mean Si (%), for instance, 50%, and a maximum Smax (%), for instance, 100%. In the graph shown in FIG. 3, the axis of abscissas represents the number of days for which the battery is not used over hundreds of hours (days), and the axis of ordinates represents an internal resistance increase rate (%) of the high-voltage battery 4.

In FIG. 3, lines show temporal changes of the internal resistance increase rates at temperatures T1-T4 (T1<T2<T3<T4) when the SOC values are 50%. Accordingly, it is understood that the higher the temperature is, the higher the internal resistance increase rate is when the SOC values are the same. When the load is applied to the high-voltage battery 4, the higher the internal resistance is, the more the voltage drops caused by the internal resistance (, that is, the more the performance is degraded). Therefore, when the SOC values are the same, the higher the temperature is, the larger the performance degradation tendency of the high-voltage battery 4 is.

FIG. 3 also shows lines at the temperatures T2 and T4 in a case of almost maximum charge (SOC=Smax) for reference. In the case of the maximum charge, when the temperature exceeds a certain temperature, the performance degradation tendency becomes very large. By the way, not only the lithium-ion battery but also any kind of battery with the above-mentioned properties may be employed as the high-voltage battery 4.

According to these principles, in a state where the high-voltage battery 4 with the properties shown in FIG. 3 has the high SOC value and the high temperature so as to be easily degraded during the soak, power-consuming components, especially, components useful for cooling the high-voltage battery 4 (such as the battery fan 24, the compressor 16, the air conditioner fan 18, and so on) are operated. Thus, either one or both at the same time of the SOC value and the temperature of the high-voltage battery 4 decreases. Accordingly, it is possible to prevent the performance degradation of the high-voltage battery 4 during the soak. To do this, in the embodiment, in a process of controlling the state of the high-voltage battery 4 (, that is, the temperature T and the SOC value of the high-voltage battery 4), it is determined whether the high-voltage battery 4 is to be easily degraded (described as "the degradation tendency is large") or to be hardly degraded (described as "the degradation tendency is small"). The battery control data 36 stored in the ROM 33 as described above are used to determine this.

Figure 4:
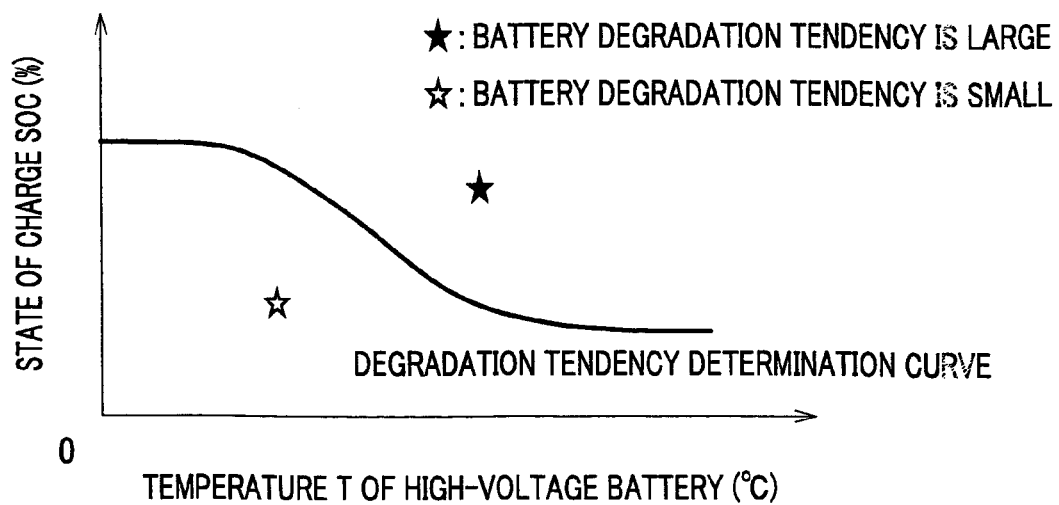
FIG. 4 is a diagram showing a degradation tendency determination curve of the high-voltage battery plotted in a plane whose coordinate axes are temperature and the SOC value.

FIG. 4 is a diagram showing a degradation tendency determination curve of the high-voltage battery 4 plotted in a T-SOC plane whose coordinate axes are the temperature and the SOC value. In FIG. 4, the axis of abscissas represents the temperature T (° C.) of the high-voltage battery 4, and the axis of ordinates represents the SOC value SOC (%) of the high-voltage battery 4. Here, in the specification, a variable in which the SOC value is stored is also expressed as SOC. A magnitude of the degradation tendency of the high-voltage battery 4 is determined depending on which one of two regions (in FIG. 4, a region on a white star side and a region on a black star side) divided by the degradation tendency determination curve a point on the T-SOC plane (or in the coordinates) in FIG. 4 specified by the temperature and the SOC value of the high-voltage battery 4 is located in. For instance, it is determined that the high-voltage battery 4 is to be hardly degraded (the degradation tendency is small) when a point specified by the temperature and the SOC value of the high-voltage battery 4 at a certain time is located in the white star side. On the other hand, it is determined that the high-voltage battery 4 is to be easily degraded (the degradation tendency is large) when the point is located in the black star side. In this sense, when the point is located right on the degradation tendency determination curve, which is a borderline, it is possible (or impossible) to determine either that the high-voltage battery 4 is to be easily degraded or that the high-voltage battery 4 is to be hardly degraded.

To obtain the degradation tendency determination curve, it is merely required to obtain sets of lines as shown in FIG. 3 corresponding to an appropriate number N of SOC values $\{Si|i=1, 2, \ldots, N\}$. In FIG. 3, though data are shown corresponding to four temperatures T1-T4, it is required to collect data merely for a predetermined number of temperatures. In each of thus obtained sets of lines as shown in FIG. 3, a threshold temperature Tsi is determined, which corresponds to a threshold internal resistance increase rate such as a median or a mean of the internal resistance increase rates. The threshold internal resistance rate is a criterion to determine whether the degradation tendency is small or large. For instance, in the example shown in FIG. 3, it is supposed that T2<Tsi<T3. A point (Tsi, Si) (not shown) is plotted in the T-SOC plane in FIG. 4 using this threshold temperature Tsi. This is performed for each of the sets of lines, corresponding to the SOC values Si so that the degradation tendency determination curve is defined. The coordinates of the threshold temperatures Tsi and the SOC values Si are used to determine whether the degradation tendency is small or large.

In general, a map or a table is used to store thus obtained curve data shown in FIG. 4. In a case of using the map, at least a value (in the example, a flag indicating the magnitude (small or large) of the degradation tendency, for instance) assigned to each of representative points on the T-SOC plane is stored. (A map table is used when the value is respectively associated with a set of coordinate values.) In a case of using the table, a set of coordinate values is stored for each of the representative points on the degradation tendency determination curve. Moreover, when the degradation tendency determination curve can be expressed as a function with a comparatively small number of coefficients, it is also possible to store the degradation tendency determination table as the function.

In JP 2000-209789 A, a charge and discharge controller of a secondary cell is disclosed. More specifically, a technology which uses a map of a range of optimal current plotted on a T-SOC plane in order to improve efficiency of charge and discharge of the secondary cell is disclosed. The map in this case is divided into five regions. However, in the embodiment, since the T-SOC plane is divided into only two regions, only a table including coordinates for the representative points on the degradation tendency determination curve is required.

Therefore, in the embodiment, operation will be described based on the assumption that the battery control data 36 are stored in the ROM33 of the battery ECU 30 as a table of coordinates of points on the degradation tendency determination curve. Each of the points specifies the state (the temperature T and the state of charge SOC) which corresponds to the threshold internal resistance increase rate which is the criterion to determine whether the degradation tendency of the high-voltage battery 4 is small or large.

Figure 5A:
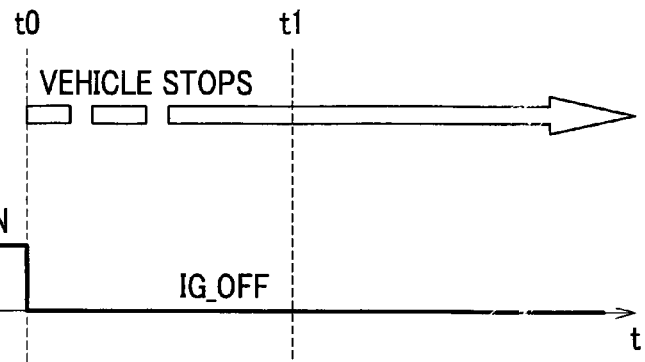
FIG. 5A is a diagram illustrating operation to control a state of the high-voltage battery using the degradation tendency determination curve.
Figure 5B:
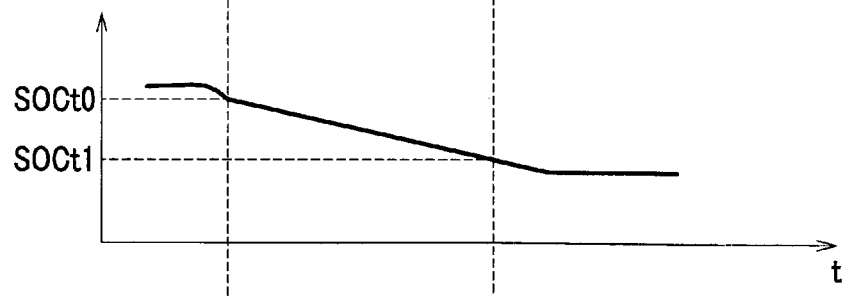
FIG. 5B is a diagram illustrating operation to control the state of the high-voltage battery using the degradation tendency determination curve.
Figure 5C:
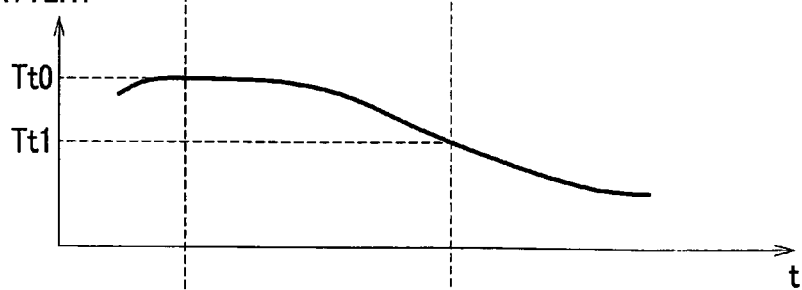
FIG. 5C is a diagram illustrating operation to control the state of the high-voltage battery using the degradation tendency determination curve.
Figure 5D:
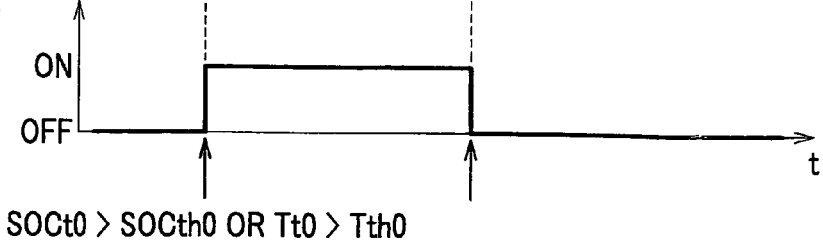
FIG. 5D is a diagram illustrating operation to control the state of the high-voltage battery using the degradation tendency determination curve.
Figure 6:
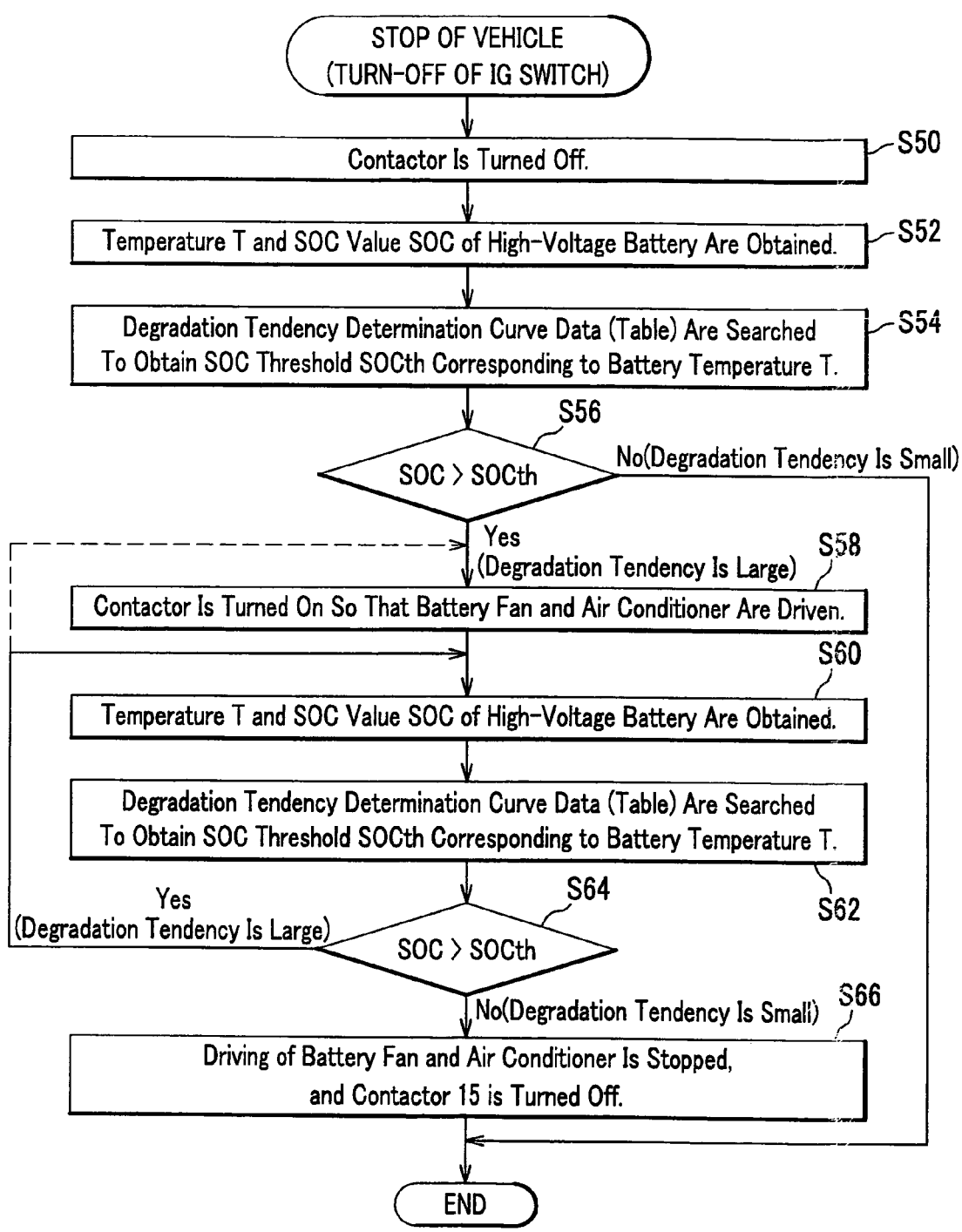
FIG. 6 is a flowchart showing a process flow of a high-voltage battery control program during a soak performed by a battery ECU when it is detected that an IG switch is turned off.

FIGS. 5A-5D are diagrams illustrating operation to control the state of the high-voltage battery using the degradation tendency determination curve shown in FIG. 4, that is, the degradation tendency determination table stored in the ROM33. FIG. 5A is a diagram showing a state of the IG switch 40. FIG. 5B is a diagram showing the SOC value of the high-voltage battery 4. FIG. 5C is a diagram showing the temperature T of the high-voltage battery 4. FIG. 5D is a diagram showing an operational state of the air conditioner AC and the battery fan 24. Each of the figures mainly shows a state after the IG switch 40 is turned off. Moreover, FIG. 6 is a flowchart showing a process flow of a high-voltage battery control program during the soak performed by the CPU 31 of the battery ECU 30. When the vehicle 1 stops, to be concrete, when it is detected that the IG switch 40 is turned off (, that is, when a stop request of the electric vehicle is detected), this program routine is called.

Figure 2:
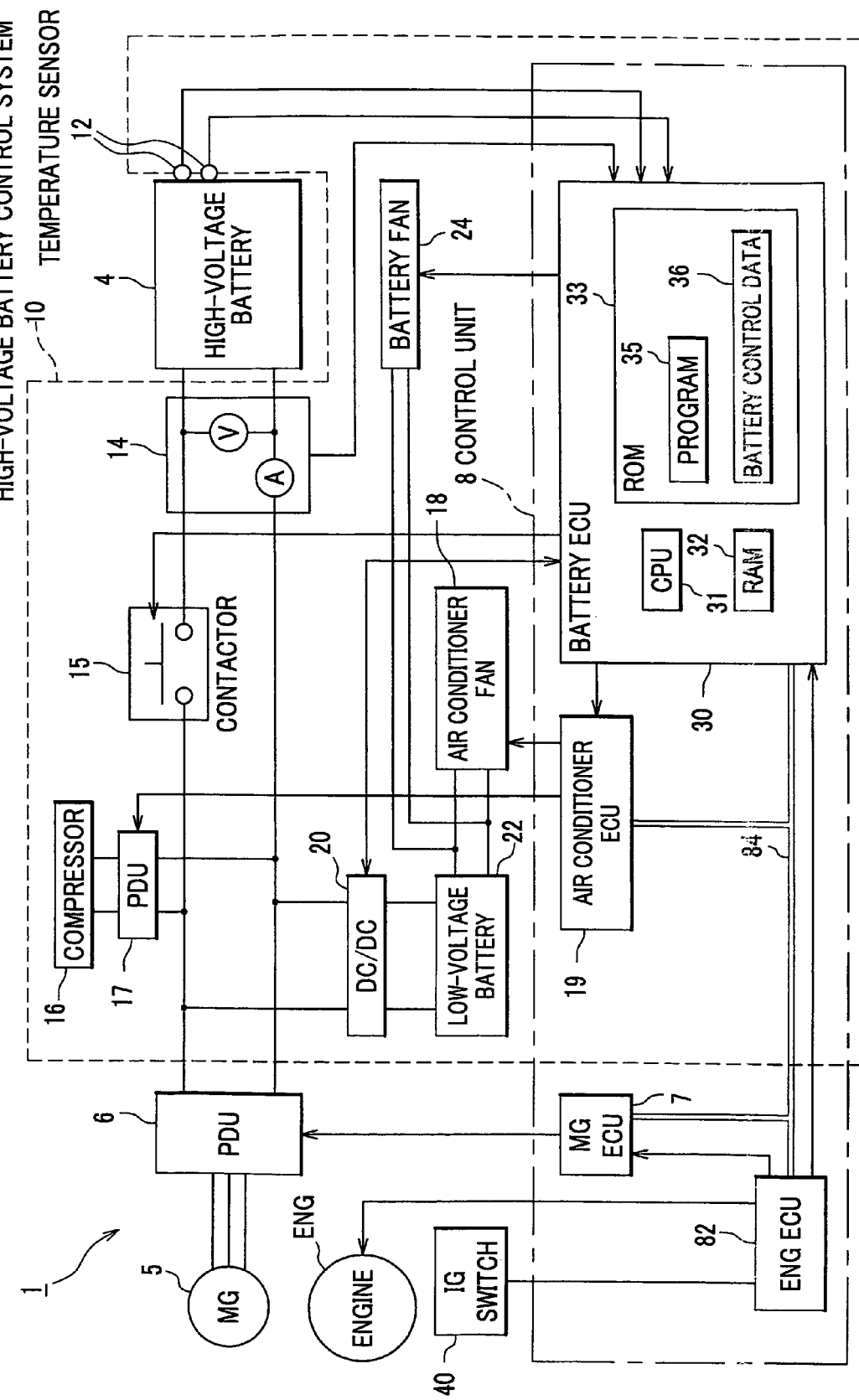
FIG. 2 is a schematic principal block diagram conceptually showing a structure of the vehicle focusing on a high-voltage battery control system.
Figure 3:
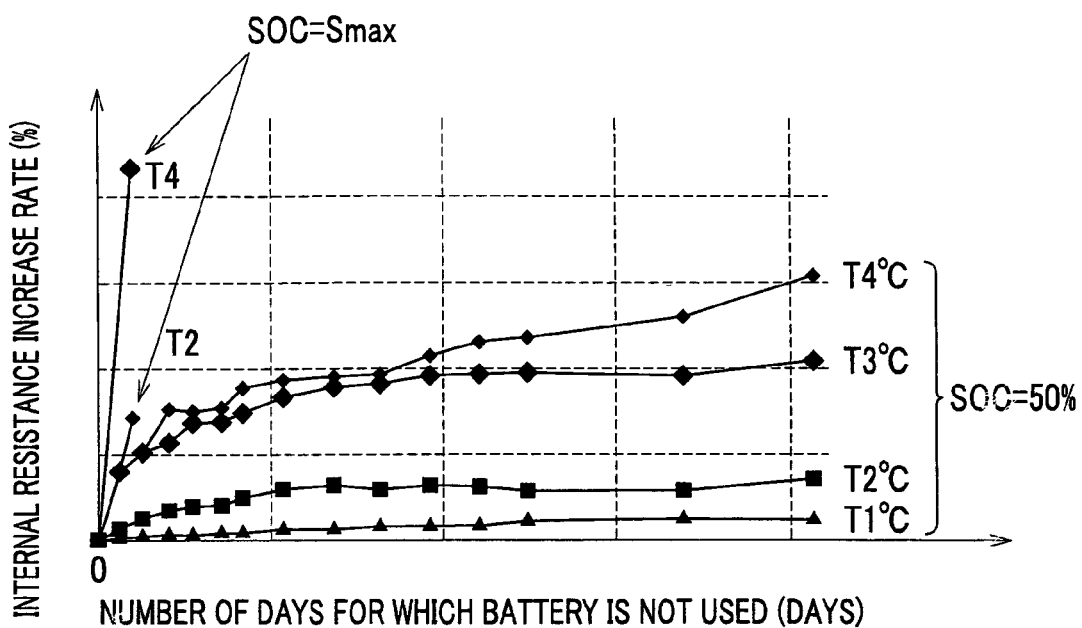
FIG. 3 is a graph showing battery performance degradation properties in a case where state of charge values of a high-voltage battery are almost equal to a mean Si (%) and a case where the state of charge values are almost equal to a maximum Smax (%)

First of all, in Step S50, the battery ECU 30 turns off the contactor 15 shown in FIG. 2 so as to stop power supply from the high-voltage battery 4. Next, in Step S52, the temperature T and the SOC value SOC of the high-voltage battery 4 are obtained based on information from the temperature sensor 12 and the SOC information acquisition unit 14. In FIG. 5, for instance, to is set to a current time, and Tt0 and SOCt0 are respectively set to a current temperature and SOC value of the high-voltage battery 4. By the way, either of a mean or a maximum of the temperatures obtained from a plurality of the temperature sensors 12 may be used as the temperature T. In Step S54, the degradation tendency determination table in the ROM33 is searched to obtain a coordinate value (in this case, a SOC threshold) SOCth corresponding to the battery temperature T.

Figure 7A:
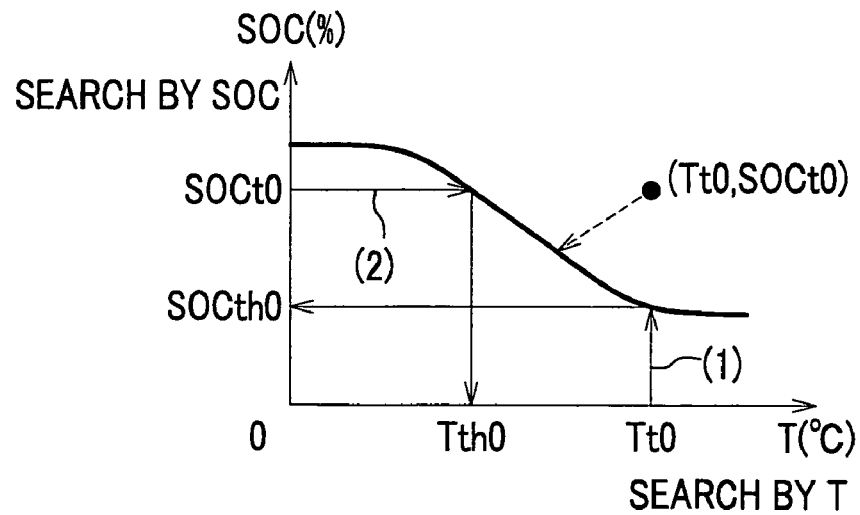
FIG. 7A is a diagram showing how to search a degradation tendency determination table.

Referring to FIG. 7A, a process at this time is described. In the example, as described as "SEARCH BY T", at first, Tt0 is found in a column of the temperature T in the degradation tendency determination table in the battery control data 36. Then, the SOC threshold SOCth0 which pairs with Tt0 is retrieved. By the way, only a limited number of data are included in the degradation tendency determination table. Therefore, in practice, the SOC threshold is calculated, for instance, by means of interpolation or the like using two sets of coordinate data which are nearest to the battery temperature Tt0. Thus obtained SOC threshold is a predetermined state of charge value set corresponding to the temperature detected by the temperature sensor in the claims.

As easily understood from the graph shown in FIG. 7A, the following two examples of (1) "SEARCH BY TEMPERATURE T" and (2) "SEARCH BY SOC" are shown as methods for searching the degradation tendency determination table.

(1) The column of the temperature T in the degradation tendency determination table is searched for the battery temperature T (Tt0). Then, a value (, that is, a SOC threshold SOCth (SOCth0)) is obtained from the corresponding column (see FIG. 7A). The coordinates of the battery temperature T (Tt0) and the SOC threshold SOCth (SOCth0) correspond to the threshold internal resistance increase rate which is the criterion to determine whether the degradation tendency is small or large.

(2) A column of the SOC value in the degradation tendency determination table is searched for the battery SOC value SOC (SOCt0). Then, a value (, that is, a temperature threshold Tth (Tth0)) is obtained from a corresponding column (see FIG. 7A). The coordinates of the SOC value SOC (SOCt0) and the temperature threshold Tth (Tth0) correspond to the threshold internal resistance increase rate which is the criterion to determine whether the degradation tendency is small or large.

In the embodiment, a case of the search by the temperature T is described as an example. Therefore, as indicated by (1) in FIG. 7A, in Step S54, the SOCth (SOCth0) is obtained using the temperature T (Tt0).

Next, in Step S56, to determine the magnitude of the performance degradation tendency, it is determined whether the SOC value SOC (SOCt0) of the high-voltage battery 4 exceeds the SOC threshold SOCth (SOCth0) obtained in Step S54. When the SOC value SOC (SOCt0) is lower than or equal to the SOC threshold SOCth (SOCth0), that is, SOC (SOCt0)≦SOCth (SOCth0), the point specified by the current state of the high-voltage battery 4 is located in the white star side in FIG. 4. Therefore, it is determined that the degradation tendency is small ("No"). Then, the routine ends. On the other hand, in Step S56, when the SOC value SOC (SOCt0) exceeds the SOC threshold SOCth (SOCth0), that is, SOC (SOCt0)>SOCth (SOCth0), the point specified by the current state of the high-voltage battery 4 is located in the black star side in FIG. 4. Therefore, it is determined that the degradation tendency is large ("Yes"). Then, the process proceeds to Step 58.

In Step 58, the battery ECU 30 turns on the contactor 15 so as to enable the high-voltage battery 4 to be discharged. In addition, the battery ECU 30 drives the battery fan 24, as well as, through the air conditioner ECU, the compressor 16 and the air conditioner fan 18 at the same time. As a result, the high-voltage battery 4 is cooled, and the SOC value is decreased. The compressor 16 and the air conditioner fan 18 together will be referred to as "the air conditioner AC", hereafter.

By the way, as shown in FIGS. 5A-5D, in the example, both of the temperature T and the SOC value SOC are considerably high in vicinity of to while the IG switch 40 is on (IG_ON). Therefore, in Step S56 right after the IG switch 40 is turned off, the CPU31 determines that the degradation tendency is large, that is, SOC (SOCt0)>SOCth (SOCth0) at the time to. Then, the process in Step S58 is performed so that the air conditioner AC and the battery fan 24 operate.

Thus, when it is determined that the degradation tendency is large, the air conditioner AC and the battery fan 24 are operated so as to decrease the SOC value of the high-voltage battery 4 and effectively cool the high-voltage battery 4. Consequently, the SOC value and the temperature of the high-voltage battery 4 decrease as time elapses. As shown by a dashed arrow in FIG. 7A, this means that a black point indicating the current state (the temperature T and the SOC value SOC) of the high-voltage battery 4 approaches the degradation tendency determination curve as time elapses.

Returning to FIG. 6, after Step S58, Steps S60-S64 exactly same with Steps S52-S56 are performed. More specifically, in Step S60, the temperature T (Tt1) and the SOC value SOC (SOCt1) of the high-voltage battery 4 are obtained similarly to Step S52. In Step S62, the SOC threshold SOCth (SOCth1) corresponding to the battery temperature T (Tt1) is obtained similarly to Step S54. In Step S64, it is determined whether the current SOC value SOC (SOCt1) exceeds the SOC threshold SOCth (SOCth1) (, that is, SOC (SOCt1)>SOCth (SOCth1)) similarly to Step S56. When SOC (SOCt1) >SOCth (SOCth1), it is determined that the degradation tendency of the high-voltage battery 4 is large ("Yes"). Then, the process goes back to Step S60 (or, may go back to Step S58 as shown by a dashed line). On the other hand, in Step S64, when the SOC value SOC (SOCt1) is lower than or equal to the SOC threshold SOCth (SOCth1) (, that is, SOC (SOCt1) ≦SOCth (SOCth1)), it is determined that the degradation tendency is small ("No"). Then, the process proceeds to Step S66. After that, the driving of the air conditioner AC and the battery fan 24 is stopped, and the contactor 15 is turned off. Then, the routine ends. As a result, it is possible to prevent the SOC value of the high-voltage battery 4 from decreasing more than necessary.

In short, after Step S58 ends, as long as the degradation tendency is large (, that is, SOC>SOCth), Steps S60-S64 are repeated to continue monitoring the temperature T and the SOC value of the high-voltage battery 4. Thus, when it is determined that the magnitude of the degradation tendency is half or smaller (, that is, SOC≦SOCth), Step S66 is performed. In other words, as shown in FIG. 5D, the air conditioner fan 18 and the battery fan 24 are maintained to be ON as long as the black point (which indicates the state of the high-voltage battery 4) shown in FIG. 7A is located above the degradation tendency determination curve (, that is, as long as the degradation tendency is large). Moreover, when it is determined that the black point reaches the degradation tendency determination curve as from FIG. 7A to FIG. 7B (in this case, the time is supposed to be t1), or is located below the degradation tendency determination curve, the air conditioner fan 18 and the battery fan 24 are controlled to be turned OFF from ON as shown in FIG. 5D.

As described above, according to the embodiment, when the ignition switch 40 is turned off in the vehicle 1 using the lithium-ion battery or the high-voltage secondary cell (high-voltage battery 4) which has the similar performance degradation property with the lithium-ion battery, means which is useful for cooling such as the air conditioner fan 18 and the battery fan 24 are operated when it is determined that the performance degradation tendency of the high-voltage secondary cell is large. Therefore, the temperature and the state of charge value of the high-voltage secondary cell start decreasing. After that, the temperature and the state of charge are monitored. Then, when it is determined that the degradation tendency of the high-voltage secondary cell is small, the operation of the means which is useful for cooling is stopped. As a result, it is possible to prevent the performance degradation of the high-voltage secondary cell during the soak. Accordingly, it is also possible to prevent the state of charge value from decreasing more than necessary. Especially, in cases of a vehicle with an idling stop function which frequently stops and starts a motor-generator 5 and a vehicle which can perform EV driving (, that is, driving using only the motor-generator for motive power), technologies of the embodiment are useful since the high-voltage secondary battery with higher output voltage than usual is used.

In the embodiment, in Step S58 for preventing the degradation, both of the battery fan 24 and the air conditioner AC are driven. However, there are various methods besides the method for driving the component which is useful for cooling the high-voltage battery in Step S58. Therefore, these methods will be discussed in the second through fourth embodiments, below.

Second Embodiment

Figure 8:
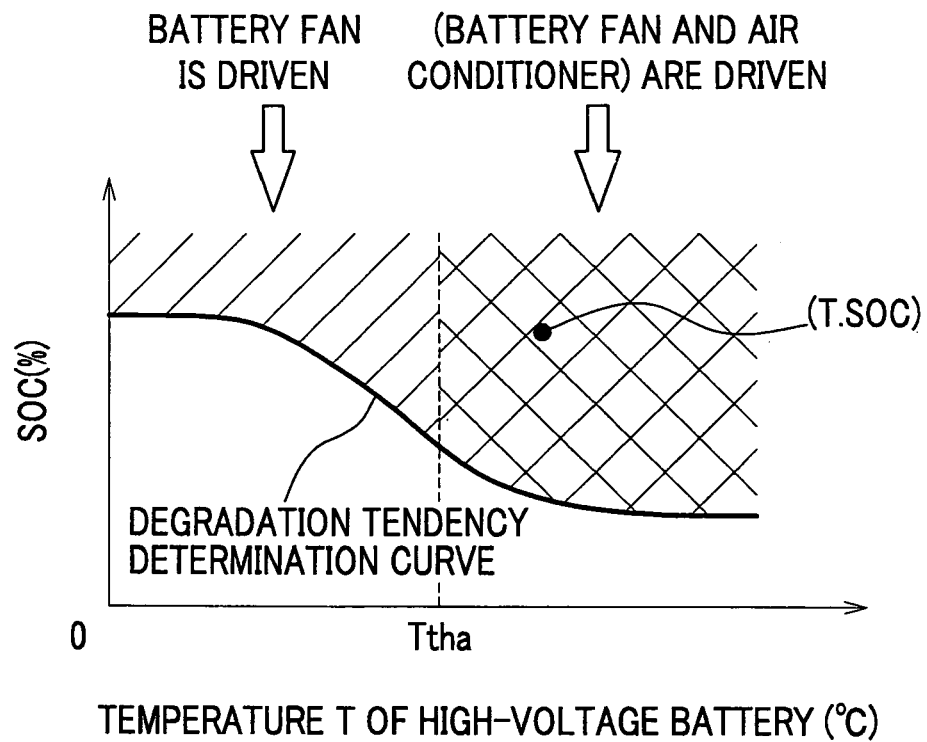
FIG. 8 is a diagram illustrating a step for preventing degradation according to a second embodiment.
Figure 9:
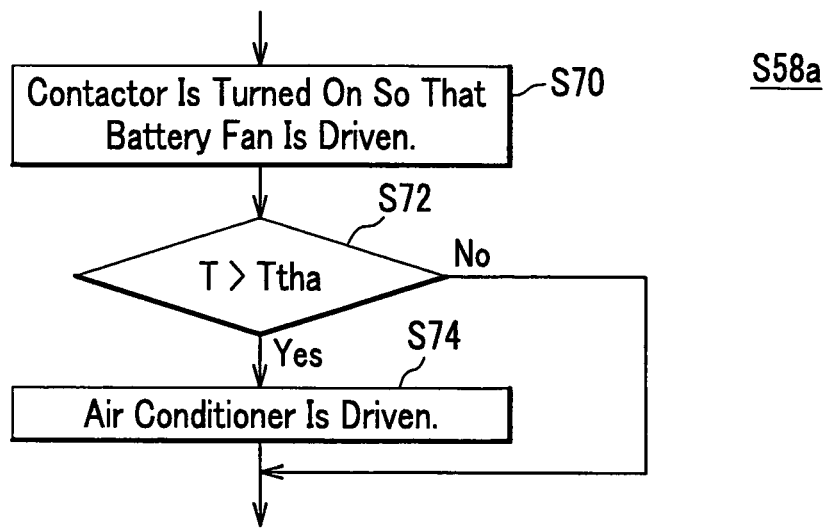
FIG. 9 is a flowchart of the step for preventing degradation according to the second embodiment.

FIG. 8 is a diagram illustrating battery control data 36 used in the second embodiment. FIG. 9 is a flowchart showing a process flow of Step S58a for preventing degradation performed in the second embodiment instead of Step S58 for preventing the degradation in FIG. 6. In the embodiment, as shown in FIG. 8, besides the degradation tendency determination curve data, a predetermined temperature Ttha is used.

In Step S56 in FIG. 6, when it is determined that the degradation tendency is large ("Yes"), the process proceeds to Step S58a. As shown in FIG. 9, in Step S70 in Step S58a, the contactor 15 is turned on so that the battery fan 24 is driven. Then, the process proceeds to Step S72. After that, the battery ECU 30 determines whether the battery temperature T exceeds the predetermined temperature Ttha. When the battery temperature T dose not exceed the predetermined temperature Ttha ("No"), the process of Step S58a ends (, that is, only the battery fan 24 is driven). Then, the process proceeds to Step S60 in FIG. 6. On the other hand, when the battery temperature T exceeds the predetermined temperature Ttha ("Yes" in S72), the battery ECU 30 drives also the air conditioner AC (, that is, the compressor 16 and the air conditioner fan 18) in Step S74. Then, the process of Step S58a ends. After that, the process proceeds to Step S60 in FIG. 6.

As described above, according to the embodiment, in a case where the SOC value SOC is higher than the SOC threshold SOCth, only the battery fan 24 is driven when the battery temperature T is lower than or equal to the predetermined temperature Ttha, and the air conditioner AC as well is driven when the battery temperature T is higher than the predetermined temperature Ttha. Therefore, when the temperature T is not so high and only a little decrease of the SOC value is required, the SOC value can be prevented from decreasing more than necessary.

In the embodiment, the predetermined temperature Ttha is set in the graph in FIG. 8. Instead, a predetermined SOC value (for instance, SOCtha) may be set. Thus, driving of the air conditioner AC may be controlled based on the SOC value SOC of the high-voltage battery 4 and the predetermined SOC value SOCtha.

Third Embodiment

Figure 10:
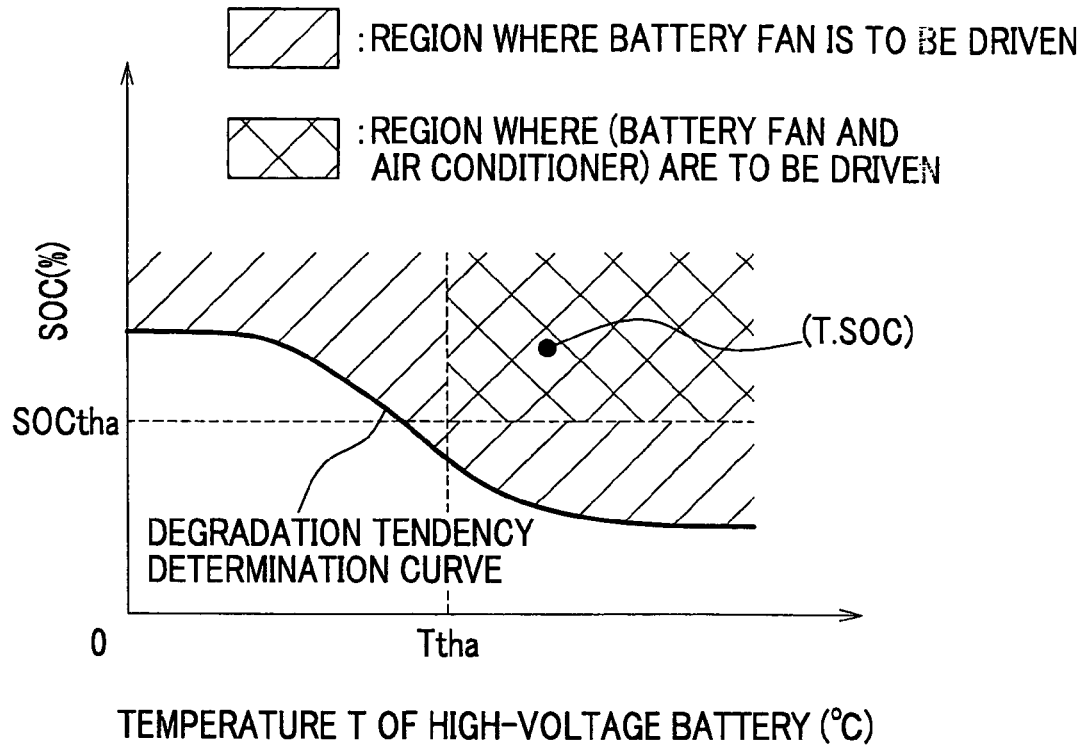
FIG. 10 is a diagram illustrating a step for preventing degradation according to a third embodiment.
Figure 11:
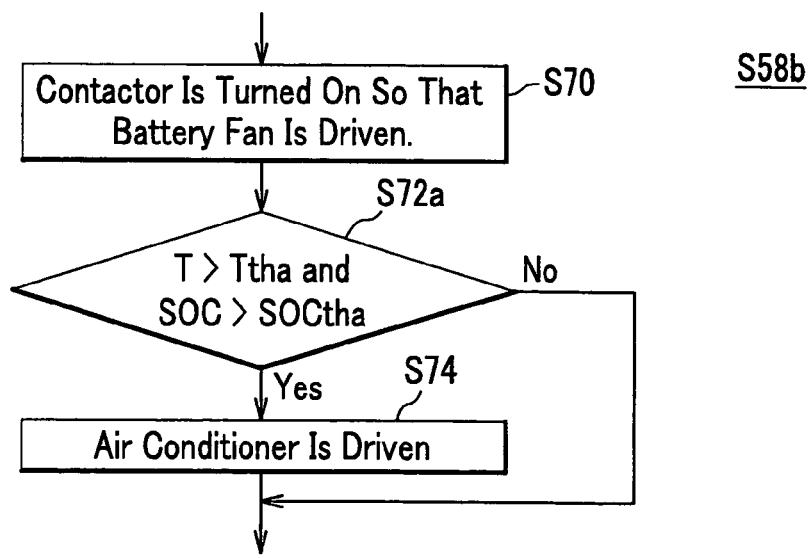
FIG. 11 is a flowchart of the step for preventing degradation according to the third embodiment.

FIG. 10 is a diagram illustrating a degradation tendency determination curve used in the third embodiment. FIG. 11 is a flowchart showing a process flow of Step S58b for preventing degradation performed in the third embodiment instead of Step S58 for preventing degradation in FIG. 6. As shown in FIG. 10, in the third embodiment, besides the degradation tendency determination curve data, a predetermined temperature Ttha and a predetermined SOC value SOCtha are used.

Except that Step S72 shown in FIG. 9 is replaced with Step S72a, Step S58b is same with Step S58a. To describe the difference, in Step S72a, it is determined whether the battery temperature T exceeds the predetermined temperature Ttha and the SOC value SOC exceeds the predetermined SOC value SOCtha.

Therefore, according to the embodiment, in a case where the SOC value SOC is higher than the SOC threshold SOCth, both of the battery fan 24 and the air conditioner AC are driven when the battery temperature T exceeds the predetermined temperature Ttha and the SOC value SOC exceeds the predetermined SOC value SOCtha. In other cases, only the battery fan 24 is driven. Description is not given about control to cause the process to go back to Step S60 or Step S58 in the case of "Yes" in Step S64 in the flowchart shown in FIG. 6 since the control is same with the second embodiment.

Fourth Embodiment

Figure 12:
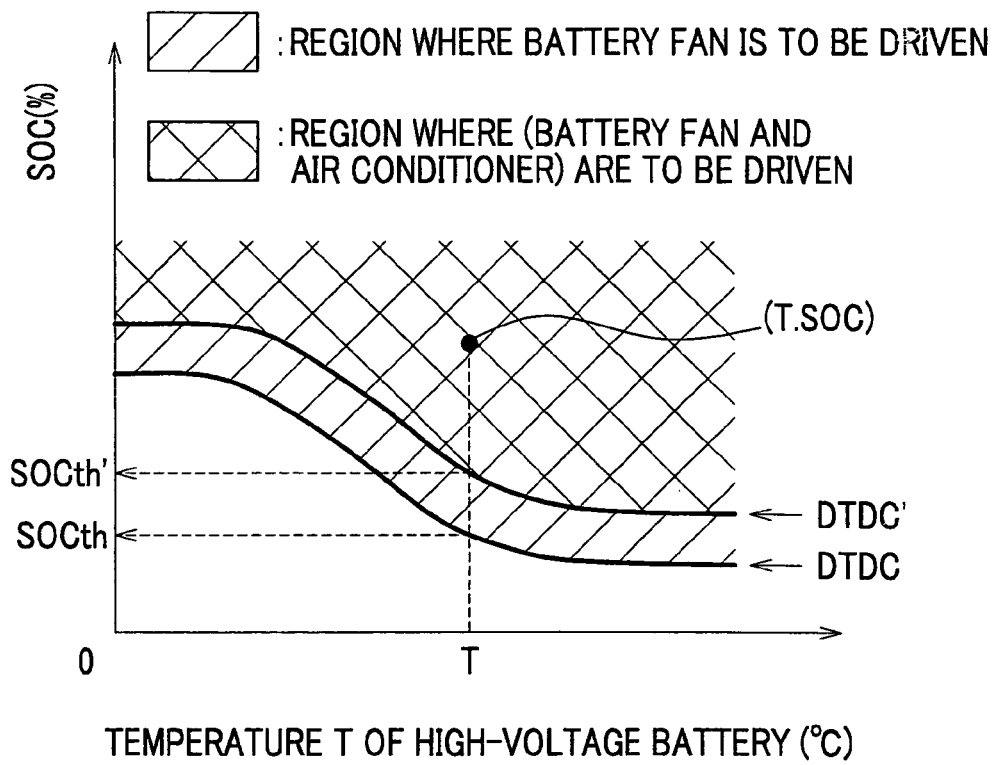
FIG. 12 is a diagram illustrating a step for preventing degradation according to a fourth embodiment.
Figure 13:
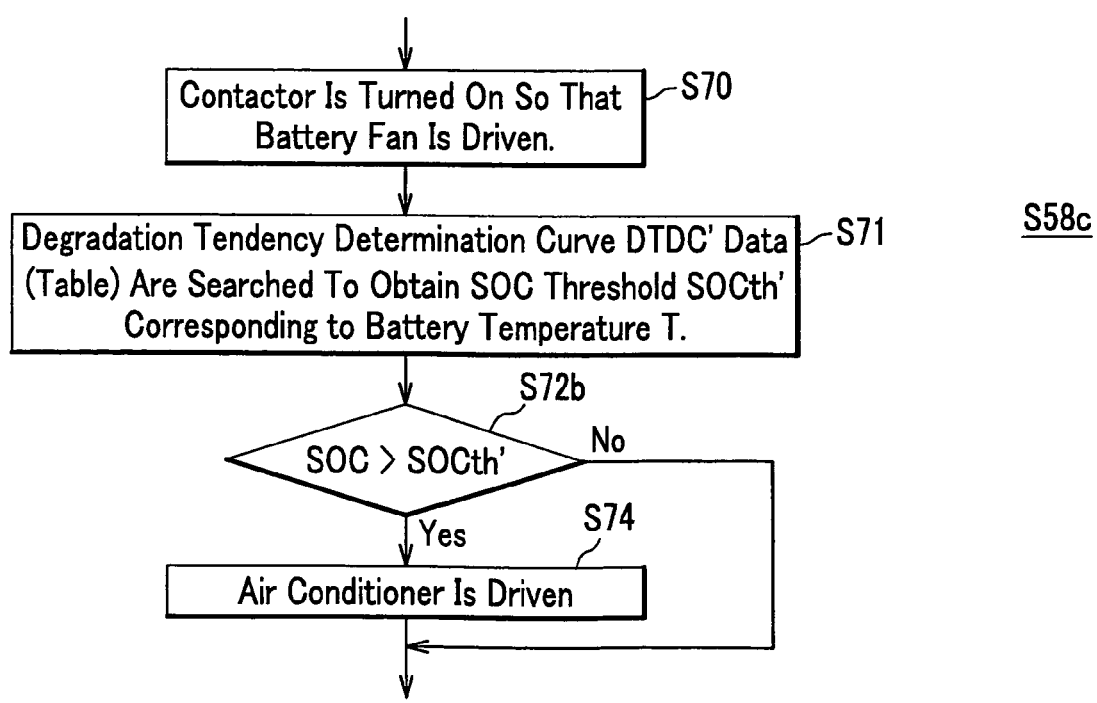
FIG. 13 is a flowchart of the step for preventing degradation according to the fourth embodiment.

FIG. 12 is a diagram illustrating degradation tendency determination curves used in the fourth embodiment. FIG. 13 is a flowchart showing a process flow of Step S58c for preventing degradation performed in the fourth embodiment instead of Step S58 for preventing degradation shown in FIG. 6. As shown in FIG. 12, in the fourth embodiment, besides the degradation tendency determination curve (DTDC) data, a second degradation tendency determination curve (DTDC') data need to be stored in the ROM33 as the battery control data 36. The second degradation tendency determination curve DTDC', which is a threshold curve used as criteria to determine whether to drive the air conditioner AC when the degradation tendency is large, is set on the side where the degradation tendency is larger than DTDC in FIG. 4. The degradation tendency determination curve DTDC expresses first predetermined state of charge values set corresponding to the temperatures detected by the temperature sensor in the claims. The second degradation tendency determination curve DTDC' expresses second predetermined state of charge values exceeding the first predetermined state of charge values in the claims.

As shown in FIG. 13, when it is determined that the degradation tendency is large in Step S56 in FIG. 6, first of all, the contactor 15 is turned on so that the battery fan 24 is driven in Step S70 in Step S58c. Next, in Step S71, the second degradation tendency determination curve DTDC' data in the ROM33 are searched to obtain the SOC threshold SOCth' corresponding to the battery temperature T. In Step S72b, it is determined whether the state of charge value SOC of the high-voltage battery 4 exceeds the SOC threshold SOCth'. When the state of charge value SOC is lower than or equal to the SOC threshold SOCth' ("No" in S72b), the process of Step S58c ends (, that is, only the battery fan 24 is driven). Then, the process proceeds to Step S60 in FIG. 6. On the other hand, when the state of charge value SOC of the high-voltage battery 4 exceeds the SOC threshold SOCth' ("Yes" in S72b), the air conditioner AC (, that is, the compressor 16 and the air conditioner fan 18) as well is driven in Step S74. Then, the process of Step S58c ends. The process proceeds to Step S60 in FIG. 6.

Fifth Embodiment

In the embodiments described above, data for the degradation tendency determination curve shown in FIG. 4 are used with no modification. However, appropriate thresholds for the temperature and the SOC value may be set based on the degradation tendency determination curve and used in determining the magnitude of the degradation tendency just as the predetermined thresholds are used in determining whether to drive the air conditioner AC in the second and the third embodiments.

Figure 14A:
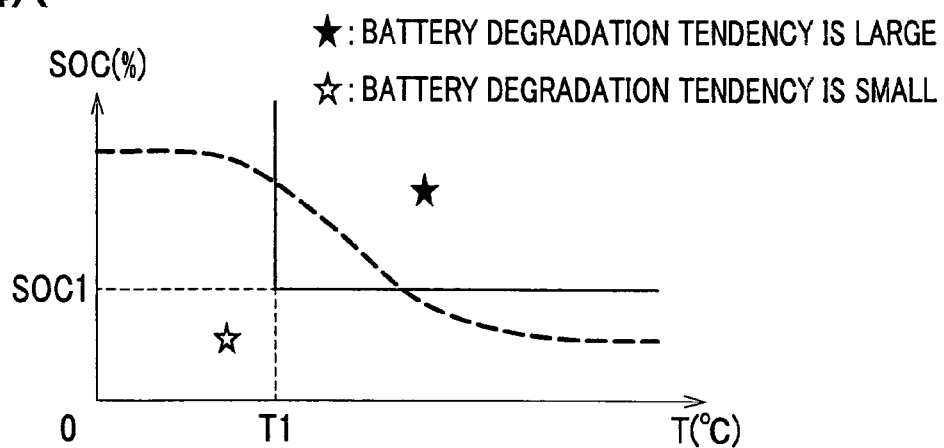
FIG. 14A is a diagram illustrating a fifth embodiment.
Figure 14B:
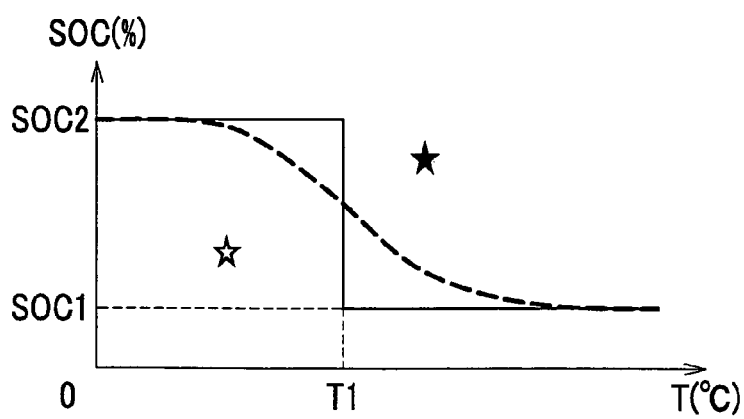
FIG. 14B is a diagram illustrating the fifth embodiment.
Figure 14C:
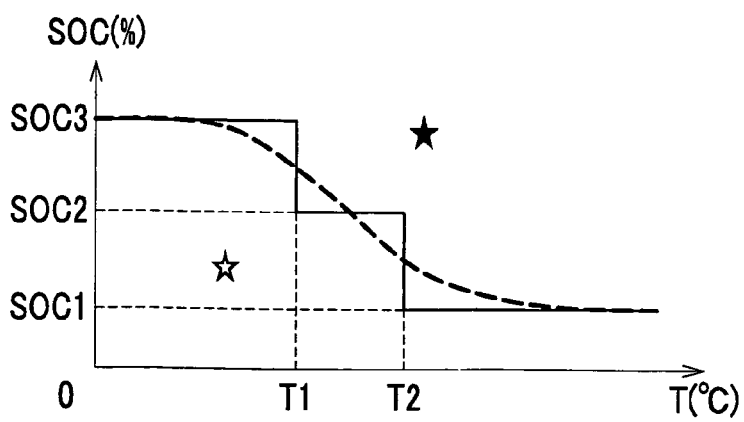
FIG. 14C is a diagram illustrating the fifth embodiment.

FIGS. 14A-14C are diagrams showing examples of setting the degradation tendency determination thresholds based on the degradation tendency determination curve shown in FIG. 4 according to the embodiment. FIG. 14A shows an example of setting one temperature threshold T1 and one SOC threshold SOC1 based on the degradation tendency determination curve. FIG. 14B shows an example of setting one temperature threshold T1 and two SOC thresholds SOC1 and SOC2. FIG. 14C shows an example of setting two temperature thresholds T1 and T2 and three SOC thresholds SOC1, SOC2, and SOC3. In any cases shown in FIGS. 14A-14C, similarly to the case in FIG. 4, the degradation tendency is large on a side where a black star is located, while the degradation tendency is small on a side where a white star is located. Moreover, according to the embodiment, the data amount of the degradation tendency determination table stored in ROM33 can be reduced, and the interpolation is not required in Steps S54 and S62 for obtaining the determination threshold.

Various Modifications

The examples of embodiments have been given merely to describe the invention above. Thus, it is easy for those skilled in the art to make various changes, modifications, and additions in the embodiments described above in accordance with the technological spirits or principles of the invention.

Figure 7B:
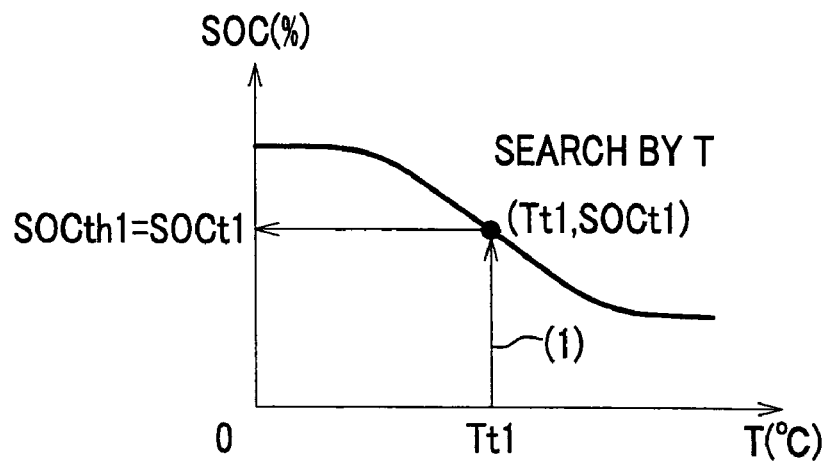
FIG. 7B is a diagram showing how to search the degradation tendency determination table.
Figure 7C:
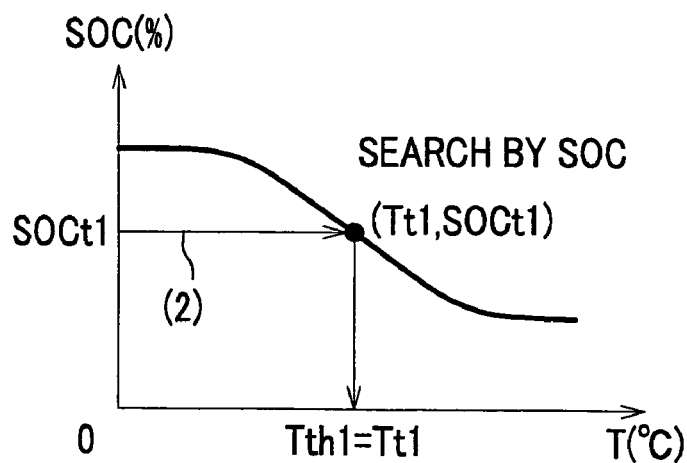
FIG. 7C is a diagram showing how to search the degradation tendency determination table.

For instance, the flowchart in FIG. 6 shows the example of searching the degradation tendency determination data table for the temperature T as illustrated by the graphs shown in FIGS. 7A and 7B. Meanwhile, as shown in FIGS. 7A and 7C, the program can also search for the SOC value. In other words, in this case, in Step S54, a temperature threshold Tth (Tth0) corresponding to the SOC value SOC (SOCt0) is obtained. Then, in Step S56, it is determined whether T (Tt0) >Tth (Tth0). Similarly, in Step S62, the temperature threshold value Tth (Tth1) corresponding to the SOC value SOC (SOCt1) is obtained. After that, in Step S64, it is only required to determine whether T (Tt1)>Tth (Tth1). Moreover, in Step S54 or S62, when the SOC value SOC (SOCt0 or SOCt1) is lower than a lower limit of the domain of the degradation tendency determination curve, it is determined that the degradation tendency is small, regardless of the battery temperature T (Tt0 or Tt1). Then, the process ends or proceeds to Step S66. On the other hand, when the SOC value SOC (SOCt0 or SOCt1) is higher than a upper limit of the domain of the degradation tendency determination curve, it is determined that the degradation tendency is large, regardless of the battery temperature T (Tt0 or Tt1). Then, the process proceeds to Step S58 or Step S60 respectively.

Figure 15:
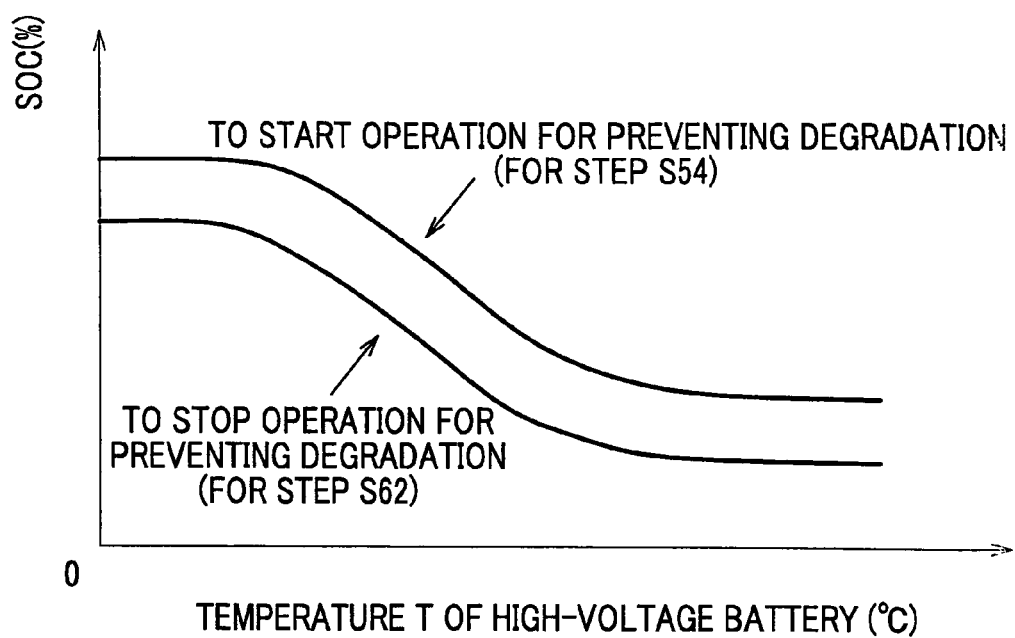
FIG. 15 is a graph showing an example of degradation tendency determination curves in a case where degradation tendency determination curves are respectively used.

In addition, in any case of the embodiments and their modified examples, in Steps S54 and S62, the only degradation tendency determination curve shown in FIG. 4 is used. However, in Steps S54 and S62, it is also possible to use two degradation tendency determination curves which do not intersect each other as shown in FIG. 15. In this modified example, when it is once determined that the degradation tendency is large, control to decrease the SOC value starts. Then, when it is determined that the degradation tendency becomes small, the process to decrease the SOC value ends. However, as shown in FIG. 15, the curve (to stop operation for preventing degradation) used in Step S62 is located on an origin side of the curve (to start operation for preventing degradation) used in Step S54. Therefore, the air conditioner operates in a hysteresis mode, and there is a longer interval between when the operation starts and stops. Moreover, it is possible to prevent the SOC value from decreasing more than necessary.

In addition, it is possible to use an offset in accordance with a technological idea similar to the modified example. In other words, in Steps S54 and S62, the only degradation tendency determination curve shown in FIG. 4 is used. Moreover, in Step S64 in the last half of the program, it may be determined whether SOC>SOCth—α (where 0<α). Such a modification brings about similar effects with the modified example described above.

An electric vehicle described in the claims includes a ship driven using a storage battery. Thus, it is easy for those skilled in the art to appropriately combine some of the embodiments and various modified examples within a scope where there is no technological conflict.

According to the invention, there is provided a controller of an electric vehicle, which can prevent performance degradation of a storage battery.

While the described embodiments represent the preferred forms of the present invention, it is to be distinctly understood that the invention is not limited thereto but may be otherwise variously embodied within the spirit and scope of the following claims.

What is claimed is:

1. A controller installed in an electric vehicle comprising:
a storage battery which stores power to be supplied to a drive motor;
a temperature sensor which detects a temperature of the storage battery;
a state of charge value sensor which detects a state of charge value of the storage battery;
a fan which cools the storage battery; and
an air conditioner which has an electric compressor driven by the power supplied from the storage battery,
the controller which controls operation of at least one of the fan and the electric compressor, comprising
a cooling control means which cools the storage battery by means of selectively or simultaneously driving at least one of the fan and the air conditioner after detecting a stop request of the electric vehicle, depending on the temperature detected by the temperature sensor and the state of charge value detected by the state of charge value sensor.

2. The controller installed in the electric vehicle as claimed in claim 1, wherein
if the state of charge value detected by the state of charge value sensor exceeds a predetermined state of charge value set corresponding to the temperature detected by the temperature sensor, the cooling control means selectively or simultaneously drives at least one of the fan and the air conditioner.

3. The controller installed in the electric vehicle as claimed in claim 1, wherein
if the temperature detected by the temperature sensor exceeds a predetermined temperature and the state of charge value detected by the state of charge value sensor exceeds a predetermined state of charge value, the cooling control means selectively or simultaneously drives at least one of the fan and the air conditioner.

4. The controller installed in the electric vehicle as claimed in claim 2, wherein
if the state of charge value detected by the state of charge value sensor exceeds a predetermined state of charge value set corresponding to the temperature detected by the temperature sensor, the cooling control means drives the fan, and
if the state of charge value detected by the state of charge value sensor exceeds the predetermined state of charge value set corresponding to the temperature detected by the temperature sensor and at least one of the temperature detected by the temperature sensor and the state of charge value detected by the state of charge value sensor exceeds a respective predetermined value, the cooling control means drives the fan and the air conditioner together.

5. The controller installed in the electric vehicle as claimed in claim 2, wherein
if the state of charge value detected by the state of charge value sensor exceeds a first predetermined state of charge value set corresponding to the temperature detected by the temperature sensor, the cooling control means drives the fan, and
if the state of charge value further exceeds a second predetermined state of charge value exceeding the first predetermined state of charge value, the cooling control means drives the fan and the air conditioner together.

6. The controller installed in the electric vehicle as claimed in claim 2, wherein
the relatively higher the temperature is, the lower the predetermined state of charge value set corresponding to the temperature detected by the temperature sensor is, and
the relatively lower the temperature is, the higher the predetermined state of charge value set corresponding to the temperature detected by the temperature sensor is.

7. The controller installed in the electric vehicle as claimed in claim 1, wherein the storage battery includes a lithium-ion battery.

8. The controller installed in the electric vehicle as claimed in claim 4, wherein
the relatively higher the temperature is, the lower the predetermined state of charge value set corresponding to the temperature detected by the temperature sensor is, and
the relatively lower the temperature is, the higher the predetermined state of charge value set corresponding to the temperature detected by the temperature sensor is.

9. The controller installed in the electric vehicle as claimed in claim 5, wherein
the relatively higher the temperature is, the lower the predetermined state of charge value set corresponding to the temperature detected by the temperature sensor is, and
the relatively lower the temperature is, the higher the predetermined state of charge value set corresponding to the temperature detected by the temperature sensor is.

* * * * *